Patented Feb. 20, 1940

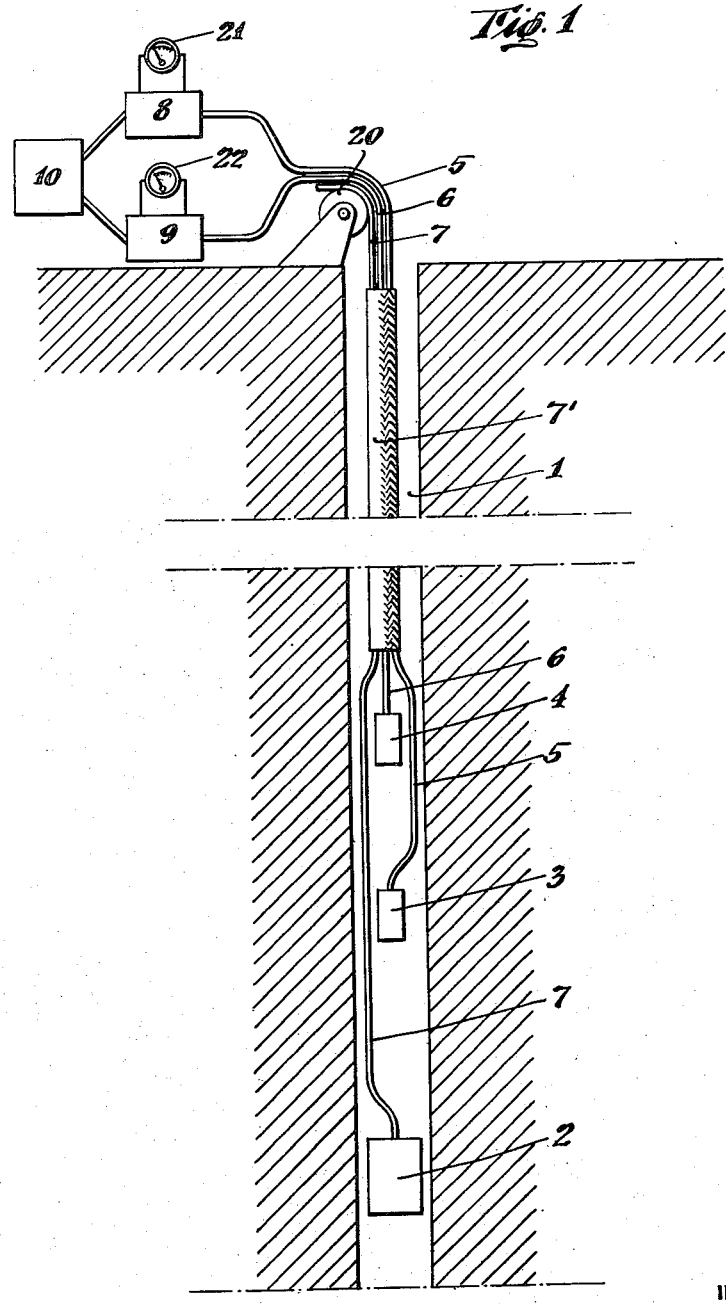

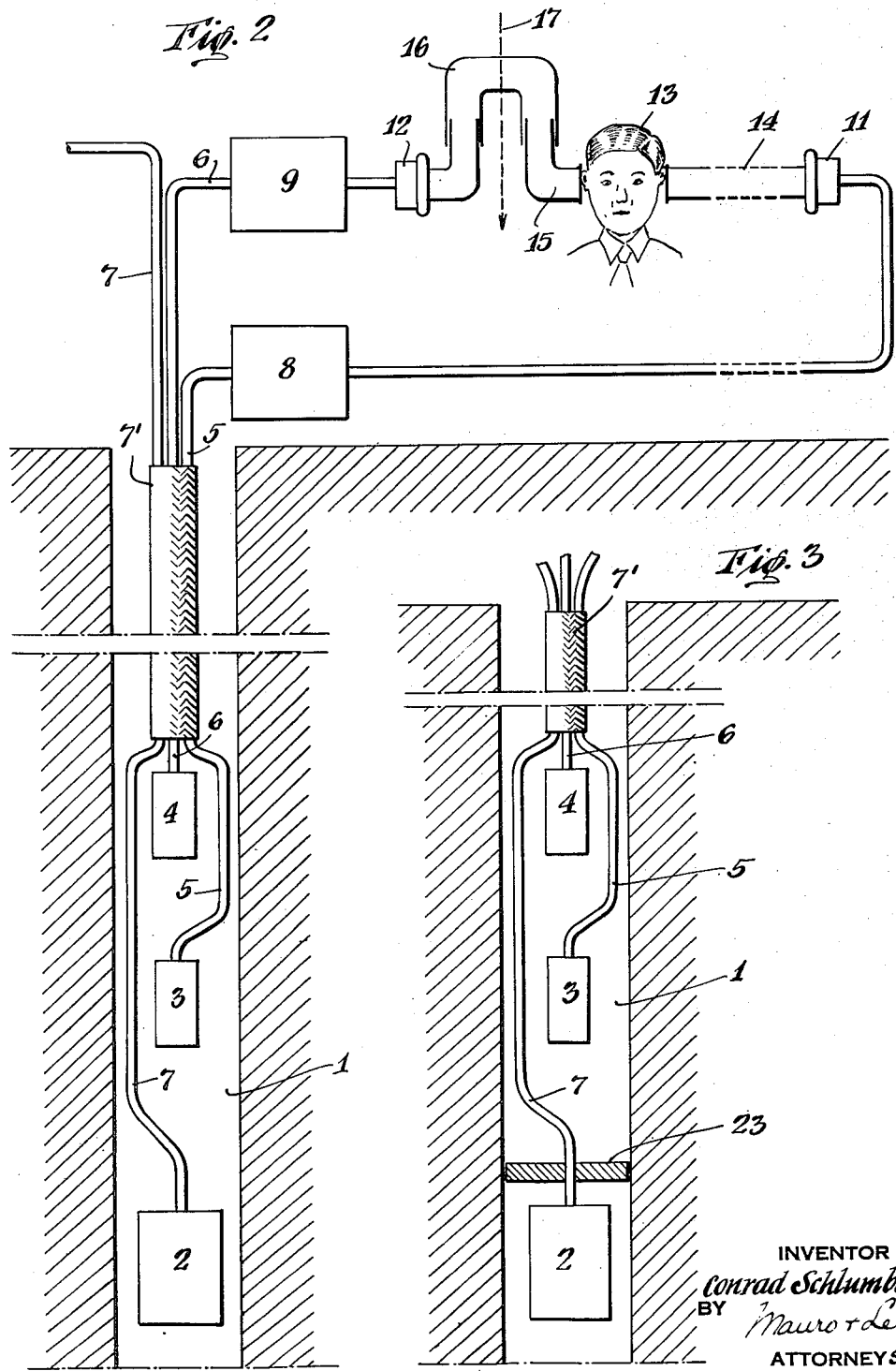

2,191,119

UNITED STATES PATENT OFFICE

2,191,119

METHOD OF AND APPARATUS FOR SURVEYING THE FORMATIONS TRAVERSED BY A BORE HOLE

Conrad Schlumberger, Paris, France; Anne Marguerite Louise Doll, administratrix of said Conrad Schlumberger, deceased, assignor, by mesne assignments, to Schlumberger Well Surveying Corporation, Houston, Tex., a corporation of Delaware Application May 11, 1935, Serial No. 21,071
In France June 1, 1934

31 Claims.  (Cl. 181—0.5)

The determination of the formations traversed by a bore hole can be carried out by mechanical coring consisting in taking cylindrical samples or cores during the boring; this process is, however, tedious and expensive.

My invention has for its first object a method of determining the local lithological character of the rocks located at different depths in a bore hole and said method consists in causing a sound emission close to each considered depth in the hole, determining between two points near to each other and to each considered depth the value of a local parameter of the sound transmitted by the rocks constituting the wall of the hole at the said depth, with a view to the preparation of a graph of the said parameter of the sound in terms of depth and deducing therefrom the lithological character to be determined.

As a parameter of the sound, there may be determined for example the value of its local velocity, its local intensity and its local damping (i. e. the sound absorption). I determine the value of the selected parameter by means of two different devices used either together or separately, as it may be of interest to determine simultaneously the values of the local velocity of the sound and of its local intensity or damping.

It is a well known fact that the velocity of propagation of sound, or more usually of elastic waves in the ground, constitutes a physical parameter characteristic of the lithological nature of the formations. All seismic prospecting is based on this principle. The present invention differs from the seismic methods now employed in that it consists in a local measurement of the velocity of the propagation in a given and even thin layer traversed by a drill hole. This cannot be achieved by any technique known up to the present. It is a fact that seismographs are frequently lowered into drill holes for the purpose of measuring the velocity of a wave between these instruments and a point of explosion situated a great distance away, usually at the surface of the ground.

The present invention is therefore a useful complement to the present day technique.

A further object of my invention is to provide means for carrying out the method of investigation above referred to.

Inside the bore hole which may contain a liquid (water, mud, or oil for instance), there is placed at the depth of the beds whose elastic properties are to be studied, a source of sound, which may be driven electrically and which preferably emits a sinusoidal vibration. At a short distance from this source of sound there are placed at a certain and small distance from each other two sound receivers, that is, in practice, two microphones. These three pieces of apparatus are connected to the surface of the ground by an electric cable, comprising the necessary insulated conductors. The electric currents produced in the two microphones and transmitted by the cable to the surface of the ground are dephased, because the sound vibration transmitted by the ground does not reach the two pieces of apparatus at the same time. For the same distance between the two microphones this phase shift is in inverse proportion to the velocity of sound in the ground. The study of this phase shift, carried out at the surface of the ground by means of a suitable apparatus connected to the various conductors of the cable, makes it possible to measure the local velocity of propagation of sound in the ground at the level in question. By moving, by means of the cable, the whole device comprising the source and the two receivers of sound, it is possible to repeat the measurement at different points of the bore hole, and so to trace a continuous graph of local sound velocities in terms of depth.

The source of sound may take the form of any known sound producing apparatus enclosed in a tight container. It is preferable to use apparatus emitting a sinusoidal vibration or at least a musical note such as an electrically maintained tuning fork, an automobile warning device of the vibrating diaphragm type or the like. However, it is possible to apply the method with the use of any kind of source of sound emitting mere noise, such as a bell. The microphones may be for example of the electromagnetic or electrostatic type.

If the vibration is sinusoidal, the phase shift between the two currents coming from the two microphones can be measured at the surface of the ground by one of the known electrical methods which are commonly used for this purpose.

The velocity of propagation V of sound in the ground is given by:

(1) $$V = 2\frac{\pi d}{\phi T}$$

in which
  $d$ is the distance between the two microphones,
  $\varphi$ is the angular phase shift expressed in radians,
  $T$ is the period of sinusoidal vibration, and
  $\pi$ is equal to 3.14.

If the vibration is not altogether sinusoidal, to measure the phase shift one can have recourse to the acoustic method known under the name "binaural hearing" which is used in certain methods of searching for the direction of a source of sound and in particular in spotting aeroplanes at night by sound. It is of interest to state briefly the principle of said method: the currents coming from the two microphones actuate respectively two telephone receivers, to one of which an observer listens with the right ear and the other with the left. The connection between each telephone and the corresponding ear of the operator is made up of an acoustic tube full of air. The tube which transmits the sound coming from the microphone further from the source of sound, that is from the microphone which is reached by the vibration later than the other microphone, can be shortened as desired so that the two sounds coming from the two microphones arrive in exact synchronism at the operator's two ears. This condition is achieved, as is known, when the operator has the impression that the sound comes from in front of him and not from the right or the left. The difference of length between the two tubes at the instant of equilibrium makes it possible to obtain the velocity of propagation of sound in the ground by means of the formula:

(2) $$V = \frac{d}{d'} u$$

in which

V is the velocity of propagation of sound in the ground,
d the distance between the two microphones,
d' the difference in length between the two acoustic tubes, and u the known velocity of sound in air.

In using one or other of the above means it is easy to add appliances, for example an amplifying voltmeter, which provide a measure of the intensity of sound picked up by one or other of the microphones, it is thus possible to measure in a single operation and at the same time the local velocity of sound and its local intensity or damping. This latter value gives an approximate measure of the local damping due to the ground and furnishes more particularly indications of the absorption caused by the different media traversed.

The accompanying drawings serve to illustrate the invention and therein:

Figure 1 is a diagram of apparatus suitable for carrying out the process of the invention;

Figure 2 is a diagram of a binaural listening arrangement, and

Fig. 3 illustrates a modified form of the invention in which screening means is inserted between the source and a receiver.

Figure 1 shows the bore hole 1 into which are introduced the source of sound 2 and the two microphones 3 and 4 both connected to the surface by insulated double conductors 5 and 6. A double conductor 7 may also be provided to feed the source of sound 2; however it is preferable for the latter to be fed by a source of energy, such as an accumulator arranged in a tight box lowered in the bore hole, to avoid any induction phenomena in the leads 5 and 6. The different conductors are stranded together to form a cable 7' which also serves for the suspension and movement of the parts 2, 3 and 4 of the apparatus. This cable is wound on a winch 20 at the surface, by means of which the apparatus is lowered into the bore hole and the depth at any instant ascertained.

The leads 5 and 6 terminate respectively at amplifiers 8 and 9 feeding the apparatus 10, which serves to measure the phase shift.

If the vibration used is sinusoidal the apparatus 10 for measuring the phase-shift and thus the local velocity is an electrical phasemeter of any suitable type. On the other hand, two voltmeters 21 and 22 are mounted on the amplifiers 8 and 9 and serve to measure the intensity of the sound picked up by the microphones 3 and 4 so as to permit the measurement of the sound absorbed by the ground strata traversed by the bore hole.

If on the contrary the vibration is not sinusoidal, the use of a phasemeter is not possible, unless the currents received are filtered in such a manner as to make them sinusoidal, but in this case it is simpler to use for measuring the phase shift binaural listening apparatus, such for example as is shown diagrammatically in Figure 2.

In this Figure 2 are shown the two amplifiers 8 and 9 which serve to amplify the currents picked up by the microphones. These amplifiers, which may be of a known type, actuate two telephone receivers 11 and 12. An observer 13 listens to the first telephone 11 with his left ear through an acoustic tube 14 of fixed length and to the second telephone 12 with his right ear through an acoustic tube 15 comprising a slide 16. By moving the slide 16 in the direction of the axis 17 one varies the length of path traversed in air by the sound between the telephone 12 and the ear of the observer. The latter regulates the position of this slide until he gets the impression that the sound he is listening to with both ears comes from straight in front of him. Operation is found to be easy and accurate; the position of the slide 16 is graduated and gives the value of the phase shift to be measured; for this purpose it is sufficient to calibrate the apparatus once and for all. From the readings is obtained the velocity of propagation of sound in the rock at the depth in question by applying Formula 2 given above.

The transmission of the two sound vibrations between the bottom of the bore hole and the operator at the surface must be carried out in an exactly similar manner on both electric lines 5 and 6 (Figure 1) in order to avoid in this transmission any additional parasitic difference of phase. This condition is easily complied with by the usual technique for such transmissions.

The source of sound and the two microphones lowered into the bore hole are immersed in the mud which always fills the latter. In addition to the vibration transmitted by the rock forming the wall of the bore hole, there is thus also a vibration transmitted by the mud, which goes direct from the source of sound to the receivers, travelling along the hole. Experience has shown that by partially closing the hole between the source and the microphones by means of suitable screens as, for example, the screen 23 in Fig. 3, it is possible to reduce the intensity of vibration transmitted by the mud to such an extent that its presence does not disturb the measurements to any marked extent. The mud in such a case does not involve any disturbance; it serves on the contrary to assure the transmission of the vibration between the source of sound and the wall of the bore hole, and then between the latter and the microphonic receivers.

What I claim is:

1. The method of determining the local lithological character of the rocks located at different depths in a bore hole, which method comprises causing an elastic wave emission in the bore hole, and obtaining indications at two points close to each other and to each considered depth of the value of at least one local parameter of the elastic wave transmitted by the rocks constituting the wall of the hole at the said depth.

2. The method of determining the local lithological character of the rocks located at different depths in a bore hole, which method comprises causing a sinusoidal elastic wave emission close to each considered depth in the bore hole, and obtaining indications at two points close to each other and to each considered depth of the value of at least one local parameter of the elastic wave transmitted by the rocks constituting the wall of the hole at the said depth.

3. The method of determining the local lithological character of the rocks located at different depths in a bore hole, which method comprises causing an elastic wave emission close to each considered depth in the bore hole, and obtaining indications at two points close to each other and to each considered depth of the value of the local intensity of the sound transmitted by the rocks constituting the wall of the hole at the considered depth.

4. The method of determining the local lithological character of the rocks located at different depths in a bore hole, which method comprises causing an elastic wave emission close to each considered depth in the bore hole, and obtaining indications at two points close to each other and to each considered depth of the value of the local damping of the elastic wave transmission through the rocks constituting the wall of the hole at the considered depth.

5. The method of determining the local lithological character of the rocks located at different depths in a bore hole, which method comprises causing an elastic wave emission close to each considered depth in the bore hole, and obtaining indications between two points close to each other and to each considered depth of the value of the local velocity of the elastic wave transmitted by the rocks constituting the wall of the hole at the considered depth.

6. The method of determining the local lithological character of the rocks located at different depths in a bore hole, which method comprises causing an elastic wave emission close to each considered depth in the bore hole, and obtaining indications at two points close to each other and to each considered depth of the value of the local intensity and simultaneously of the local velocity of the elastic wave transmitted by the rocks constituting the wall of the hole at the considered depth.

7. The method of determining the local lithological character of the rocks located at different depths in a bore hole, which method comprises causing a sinusoidal elastic wave emission close to each considered depth in the bore hole, and obtaining indications at two points close to each other and to each considered depth of the value of the local intensity of the elastic wave transmitted by the rocks constituting the wall of the hole at the considered depth.

8. The method of determining the local lithological character of the rocks located at different depths in a bore hole, which method comprises causing a sinusoidal elastic wave emission close to each considered depth in the bore hole, and obtaining indications at two points close to each other and to each considered depth of the value of the local damping of the elastic wave transmission through the rocks constituting the wall of the hole at the considered depth.

9. The method of determining the local lithological character of the rocks located at different depths in a bore hole, which method comprises causing a sinusoidal elastic wave emission close to each considered depth in the bore hole, and obtaining indications between two points close to each other and to each considered depth of the value of the local velocity of the elastic wave transmitted by the rocks constituting the wall of the hole at the considered depth.

10. The method of determining the local lithological character of the rocks located at different depths in a bore hole, which method comprises causing a sinusoidal elastic wave emission close to each considered depth in the bore hole, and obtaining indications at two points close to each other and to each considered depth of the value of the local intensity and simultaneously of the local velocity of the elastic wave transmitted by the rocks constituting the wall of the hole at the considered depth.

11. Apparatus for determining the local lithological character of the rocks located at different depths in a bore hole, which comprises an elastic wave emitter adapted to be lowered to various depths in the hole, two elastic wave transmitters adapted to be lowered at various depths in the hole, said depths being close to each other and close to the depth at which the elastic wave emitter is lowered, and means connected to said transmitters for obtaining indications of a parameter of the elastic wave received thereby.

12. Apparatus for determining the local lithological character of the rocks located at different depths in a bore hole, which comprises a sound emitter adapted to be lowered to various depths in the hole, two microphones adapted to be lowered at various depths in the bore hole, said depths being close to each other and close to the depth at which the sound emitter is lowered, and means connected to said microphones for obtaining indications of the difference of phase between the sound vibrations issued from the sound emitter and transmitted through the rocks forming the wall of the hole to the two microphones.

13. Apparatus for determining the local lithological character of the rocks located at different depths in a bore hole, comprising a sound emitter, a source of current connected to feed the sound emitter and located within the bore hole, means for lowering the sound emitter and the source of current to various depths in the hole, two microphones adapted to be lowered to various depths in the bore hole, said depths being close to each other and close to the depth at which the sound emitter is lowered, means at the surface of the soil for obtaining indications of the difference of phase between the sound vibrations issued from the sound emitter and transmitted through the rocks forming the wall of hole to the two microphones and electrical connections between said latter means and the two microphones.

14. Apparatus for determining the local lithological character of the rocks located at different depths in a bore hole, comprising a sound emitter, a source of current connected to feed the sound emitter and located within the bore hole, means for lowering the sound emitter and the source of current to various depths in the hole, two microphones adapted to be lowered to various depths in the bore hole, said depths being close to each other and close to the depth at which the sound emitter is lowered, an electrical phasemeter at the surface of the soil, electrical connections between said phasemeter and the two microphones, and amplifiers between said phasemeter and the microphones.

15. Apparatus for determining the local lithological character of the rocks located at different depths in a bore hole, comprising a sound emitter, a source of current connected to feed the sound emitter and located within the bore hole, means for lowering the sound emitter and the source of current to various depths in the hole, two microphones adapted to be lowered to various depths in the bore hole, said depths being close to each other and close to the depth at which the sound emitter is lowered, at the surface of the soil a binaural listening apparatus, electrical connections between the said listening apparatus and the microphones, and amplifiers in said electrical connections between the microphones and the listening apparatus.

16. A method of determining geological structure of the earth in the vicinity of drill holes, which comprises transmitting compressional waves through the drill hole and receiving at various known points in the drill hole, the compressional waves so transmitted and obtaining indications of the intensity of such reception whereby the character of the wall structure may be ascertained.

17. A method of exploring the porosity of the wall structure of drill holes which comprises creating a source of acoustic energy within the drill hole, receiving such energy transmitted along the drill hole at various known points and obtaining indications of the absorption by means of the variation of intensity of the energy received at various points in the drill hole.

18. A system for obtaining indications of absorption due to the wall structure of a drill hole which comprises means for generating waves, means for receiving such waves at various points in the drill hole and means for indicating the intensity of the waves received.

19. A process for determining the nature of geological formations traversed by a drill hole, which comprises generating sound in the drill hole and obtaining indications of the acoustical absorbtivity of the formations encountered at different depths inside the drill hole.

20. A means for obtaining indications of absorption of sound as an element of the measure of the porosity of the wall structure in a drill hole, comprising a cable adapted to be lowered in a drill hole, having a sound-generating mechanism connected thereto, a plurality of spaced receivers and means holding said receivers to said cable whereby said receivers have a definite position one to the other.

21. In a device of the kind described, a cable having a plurality of spaced elastic wave receivers secured thereto, said cable having a plurality of conducting leads, two for each of said receivers on said cable.

22. A means for obtaining indications of absorption of mechanical vibrations as an element of the measure of the porosity of the wall structure in a drill hole, comprising a cable adapted to be lowered in a drill hole having means for producing mechanical vibrations secured thereto, means for receiving the vibrations produced by said producing means and means for securing the receiving means to said cable.

23. A method of determining geological structure of the earth in the vicinity of a drill hole which comprises transmitting compressional wave vibrations at desired points in a drill hole and receiving said compressional vibrations at points spaced always the same distance from the source of the production of the compressional waves.

24. A method of determining geological structure of the earth in the vicinity of a drill hole, which comprises transmitting continuous compressional wave vibrations through the drill hole, receiving the compressional wave vibrations so produced elsewhere in the drill hole and obtaining indications of the intensity of the waves so received.

25. A method of determining geological structure of the earth in the vicinity of a drill hole which comprises transmitting continuous compressional wave vibrations through the drill hole, receiving the compressional wave vibrations at spaced points in the drill hole and obtaining indications of the intensity of the waves so received.

26. The method of logging a well which comprises the steps of transmitting elastic waves through the formations surrounding the bore hole and determining the difference between the times of arrival of the elastic waves at at least two spaced points in the bore hole.

27. The method of logging a well which comprises the steps of disposing a group of at least two elastic wave detectors in a well, transmitting elastic waves through the formations surrounding the bore hole, and determining the difference between the times of arrival of elastic waves at each of said detectors.

28. The method of logging a well which comprises the steps of disposing a group of at least two elastic wave detectors in a well, the said detectors being vertically spaced apart a short distance, generating elastic waves at a point substantially vertically aligned with said detectors, and determining the difference between the times of arrival of elastic waves at each of said detectors.

29. Apparatus for investigating earth formations traversed by a bore hole, comprising means for generating elastic waves in the bore hole, means for receiving the waves at at least two other points in the bore hole, means for providing indications of the intensity of the waves received, and means for providing indications of the difference in phase between the waves received at said two points.

30. In apparatus for determining the nature of earth formations traversed by a bore hole, the combination of means for generating elastic wave energy in the bore hole, means for receiving elastic wave energy in the bore hole, and means in the bore hole for obstructing the passage of the wave energy therethrough whereby the major portion of the wave energy received by the receiving means will be transmitted thereto through the surrounding formations.

31. Apparatus for determining the nature of earth formations traversed by a bore hole comprising means for generating elastic waves, at least two spaced receivers in the bore hole and adjustable means for modifying the phase of the wave received by one of said receivers, to reduce the phase difference between the waves received by the respective receivers to a predetermined value, whereby the phase difference between the waves received may be determined.

CONRAD SCHLUMBERGER.